US012795759B2

(12) United States Patent
Inoue et al.

(10) Patent No.: US 12,795,759 B2
(45) Date of Patent: Nov. 10, 2026

(54) BASE STATION AND TERMINAL APPARATUS

(71) Applicant: NTT, Inc., Tokyo (JP)

(72) Inventors: Yasuhiko Inoue, Musashino (JP); Akira Kishida, Musashino (JP); Kengo Nagata, Musashino (JP); Yusuke Asai, Musashino (JP); Yasushi Takatori, Musashino (JP)

(73) Assignee: NTT, Inc., Tokyo (JP)

( * ) Notice: Subject to any disclaimer, the term of this patent is extended or adjusted under 35 U.S.C. 154(b) by 504 days.

(21) Appl. No.: 17/911,703

(22) PCT Filed: Mar. 17, 2020

(86) PCT No.: PCT/JP2020/011814

§ 371 (c)(1),
(2) Date: Sep. 15, 2022

(87) PCT Pub. No.: WO2021/186586

PCT Pub. Date: Sep. 23, 2021

(65) Prior Publication Data

US 2023/0180318 A1 Jun. 8, 2023

(51) Int. Cl.
*H04W 76/15* (2018.01)

(52) U.S. Cl.
CPC .................................. *H04W 76/15* (2018.02)

(58) Field of Classification Search
None
See application file for complete search history.

(56) References Cited

U.S. PATENT DOCUMENTS

| | | | | |
|---|---|---|---|---|
| 2020/0221367 | A1* | 7/2020 | Hashemi | H04L 45/22 |
| 2022/0287121 | A1* | 9/2022 | Hwang | H04W 76/15 |
| 2023/0007716 | A1* | 1/2023 | Inohiza | H04W 76/15 |

OTHER PUBLICATIONS

[No Author Listed], "Part 11: Wireless LAN Medium Access Control (MAC) and Physical Layer (PHY) Specifications ("Figure 4-25 Establishing the IEEE 802.11 association" and "11.3 STA authentication and association")," IEEE Std 802.Nov. 2016, Dec. 7, 2016, 21 pages.

* cited by examiner

*Primary Examiner* — The Hy Nguyen
(74) *Attorney, Agent, or Firm* — Fish & Richardson P.C.

(57) ABSTRACT

A base station of an embodiment includes first and second wireless signal processing units, and a link management unit. The first wireless signal processing unit is configured to transmit and receive wireless signals using the first band. The second wireless signal processing unit is configured to transmit and receive wireless signals using a second band different from the first band. The link management unit manages link states of the first and second wireless signal processing units. If each of the first and second wireless signal processing units has established a link by executing association processing with the same terminal apparatus, upon receiving a multi-link request from the terminal apparatus, the link management unit establishes a multi-link with the terminal apparatus using the first wireless signal processing unit and the second wireless signal processing unit.

6 Claims, 10 Drawing Sheets

Fig. 8

| STA FUNCTION | FREQUENCY BAND | LINK DESTINATION ID | MULTI-LINK | TID |
|---|---|---|---|---|
| STA1 | 6GHz | XX | O | #1,#2 |
| STA2 | 5GHz | XX | O | #1,#3 |
| STA3 | 2.4GHz | – | – | – |

Fig. 10

| STA FUNCTION | FREQUENCY BAND | CHANNEL ID | LINK DESTINATION ID | MULTI-LINK | TID |
|---|---|---|---|---|---|
| STA1 | 6 GHz BAND | CH1 | – | – | – |
| | | CH2 | XX | ○ | #1,#2 |
| | | CH3 | – | – | – |
| STA2 | 6 GHz BAND | CH1 | – | – | – |
| | | CH2 | – | – | – |
| | | CH3 | XX | ○ | #1,#3 |

BASE STATION AND TERMINAL APPARATUS

CROSS-REFERENCE TO RELATED APPLICATIONS

This application is a National Stage application under 35 U.S.C. § 371 of International Application No. PCT/JP2020/011814, having an International Filing Date of Mar. 17, 2020. The disclosure of the prior application is considered part of the disclosure of this application, and is incorporated by reference in its entirety into this application.

TECHNICAL FIELD

An embodiment relates to a base station and a terminal apparatus.

BACKGROUND ART

A wireless LAN (Local Area Network) is known as a wireless system for wirelessly connecting a base station and a terminal apparatus.

CITATION LIST

Non-Patent Literature

NPL 1: IEEE Std 802.11-2016, "FIG. 4-25 Establishing the IEEE 802.11 association" and "11.3 STA authentication and association", 7 Dec. 2016

SUMMARY OF THE INVENTION

Technical Problem

A problem to be solved is to improve the speed and stability of wireless communication.

Means for Solving the Problem

A base station of an embodiment includes a first wireless signal processing unit, a second wireless signal processing unit, and a link management unit. The first wireless signal processing unit is configured to be able to transmit and receive a wireless signal using a first band. The second wireless signal processing unit is configured to be able to transmit and receive a wireless signal using a second band that is different from the first band. The link management unit manages the link state of the first wireless signal processing unit and the link state of the second wireless signal processing unit. If each of the first wireless signal processing unit and the second wireless signal processing unit has established a link by executing association processing with the same terminal apparatus, upon receiving a request for a multi-link from the terminal apparatus, the link management unit establishes a multi-link with the terminal apparatus using the first wireless signal processing unit and the second wireless signal processing unit.

Advantageous Effects of the Invention

The base station of the embodiment can improve the speed and stability of wireless communication.

BRIEF DESCRIPTION OF DRAWINGS

FIG. 8 is a table showing an example of link management information in the wireless system according to the embodiment.

FIG. 10 is a table showing an example of link management information in the wireless system according to a modified example of the embodiment.

DESCRIPTION OF EMBODIMENTS

Figure 1:
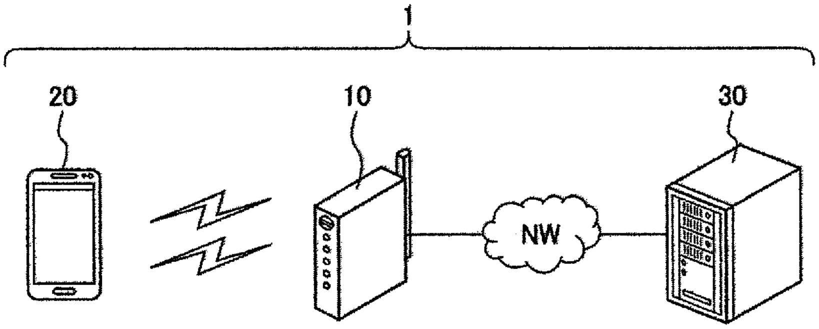
FIG. 1 is a conceptual diagram showing an example of an overall configuration of a wireless system according to an embodiment.

Hereinafter, embodiments will be described with reference to the drawings. Each embodiment illustrates an apparatus or method for embodying the technical idea of the invention. The drawings are schematic or conceptual, and the dimensions and ratios of each drawing are not necessarily the same as the actual ones. The technical idea of the present invention is not specified by the shape, structure, arrangement, and the like of the constituent elements.

In the following description, components having substantially the same function and configuration are denoted by the same reference numerals. Letters following numerals in reference signs are used to distinguish between elements that are referred to by reference signs including the same letters and have the same configuration. If there is no need to distinguish between elements that are indicated by reference signs including the same numerals, these elements are referred to by reference signs including only the same numerals.

<1> First Embodiment

A wireless system 1 according to a first embodiment will be described hereinafter.

<1-1> Configuration of Wireless System 1

FIG. 1 shows an example of a configuration of the wireless system 1 according to the first embodiment. As shown in FIG. 1, the wireless system 1 includes, for example, a base station 10, a terminal apparatus 20, and a server 30.

The base station 10 is connected to a network NW and is used as an access point of a wireless LAN. For example, the base station 10 can wirelessly distribute data received from the network NW to the terminal apparatus 20. Also, the base station 10 can be connected to the terminal apparatus 20 using one type of band or a plurality of types of bands. In the present specification, a wireless connection between the base station 10 and the terminal apparatus 20 using a plurality of types of bands is referred to as a "multi-link". Communication between the base station 10 and the terminal apparatus 20 is based on, for example, the IEEE 802.11 standard.

The terminal apparatus 20 is, for example, a wireless terminal such as a smartphone or a tablet PC. The terminal apparatus 20 can transmit and receive data to and from a server 30 on the network NW via the base station 10, which is connected wirelessly. Note that the terminal apparatus 20 may be another electronic device such as a desktop computer or a laptop computer. The terminal apparatus 20 can be a device that can communicate with at least the base station 10 and can execute later-described operations.

The server 30 can hold various types of information, and for example, holds data of content for the terminal apparatus 20. The server 30 is connected to, for example, the network NW by wire, and is configured to be able to communicate with the base station 10 via the network NW. Note that the server 30 is be able to communicate with at least the base station 10. That is, communication between the base station 10 and the server 30 may be by wire or wireless.

<1-1-1> Configuration of Base Station 10

Figure 2:
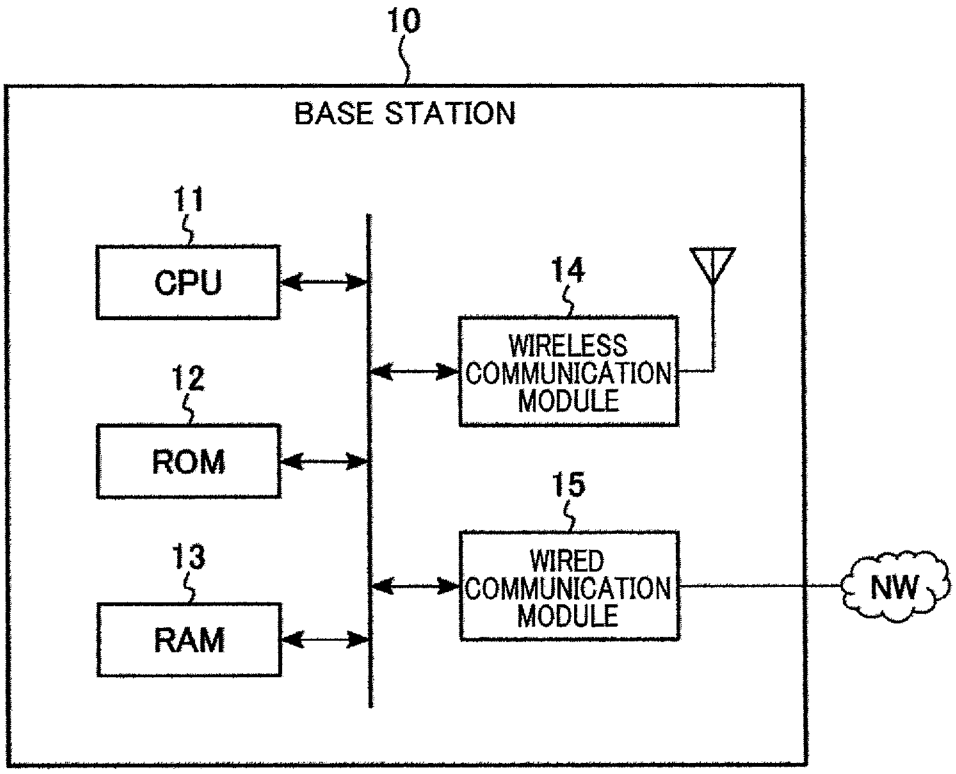
FIG. 2 is a block diagram showing an example of a configuration of a base station included in the wireless system according to the embodiment.

FIG. 2 shows an example of a configuration of the base station 10 included in the wireless system 1 according to the first embodiment. As shown in FIG. 2, the base station 10 includes, for example, a CPU (Central Processing Unit) 11, a ROM (Read Only Memory) 12, a RAM (Random Access Memory) 13, a wireless communication module 14, and a wired communication module 15.

The CPU 11 is a circuit that can execute various programs, and controls the overall operation of the base station 10. The ROM 12 is a non-volatile semiconductor memory, and holds a program, control data, and the like for controlling the base station 10. The RAM 13 is, for example, a volatile semiconductor memory and is used as a work region of the CPU 11. The wireless communication module 14 is a circuit used for transmitting and receiving data by a wireless signal, and is connected to an antenna. Also, the wireless communication module 14 includes, for example, a plurality of communication modules respectively corresponding to a plurality of frequency bands. The wired communication module 15 is a circuit used for transmitting and receiving data by a wired signal, and is connected to the network NW.

<1-1-2> Configuration of Terminal Apparatus 20

Figure 3:
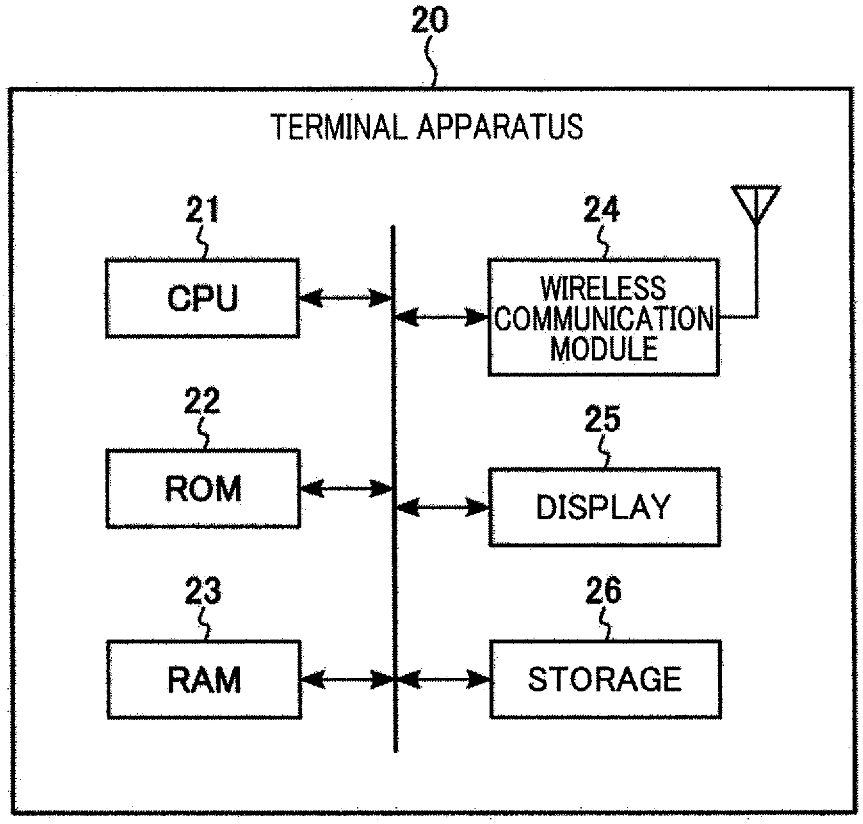
FIG. 3 is a block diagram showing an example of a configuration of a terminal apparatus included in the wireless system according to the embodiment.

FIG. 3 shows an example of a configuration of the terminal apparatus 20 included in the wireless system 1 according to the first embodiment. As shown in FIG. 3, the terminal apparatus 20 includes, for example, a CPU 21, a ROM 22, a RAM 23, a wireless communication module 24, a display 25, and a storage 26.

The CPU 21 is a circuit that can execute various programs, and controls the overall operation of the terminal apparatus 20. The ROM 22 is a non-volatile semiconductor memory, and holds a program, control data, and the like for controlling the terminal apparatus 20. The RAM 23 is, for example, a volatile semiconductor memory and is used as a work region of the CPU 21. The wireless communication module 24 is a circuit used for transmitting and receiving data by a wireless signal, and is connected to an antenna. Also, the wireless communication module 24 includes, for example, a plurality of communication modules that respectively correspond to a plurality of frequency bands. The display 25 displays, for example, a GUI (Graphical User Interface) corresponding to application software. The display 25 may include a function of an input interface of the terminal apparatus 20. The storage 26 is a non-volatile storage device, and holds, for example, system software and the like of the terminal apparatus 20.

<1-2> Operation of Wireless System 1

The wireless system 1 according to the first embodiment executes data communication based on an OSI (Open Systems Interconnection) reference model. In the OSI reference model, the communication function is divided into 7 layers (first layer: physical layer, second layer: data link layer, third layer: network layer, fourth layer: transport layer, fifth layer: session layer, sixth layer: presentation layer, seventh layer: application layer). The data link layer includes, for example, an LLC (Logical Link Control) layer and a MAC (Media Access Control) layer. In the present specification, the third to seventh layers are referred to as "upper layers" using the data link layer as a reference.

<1-2-1> Format of Wireless Frame

Figure 4:
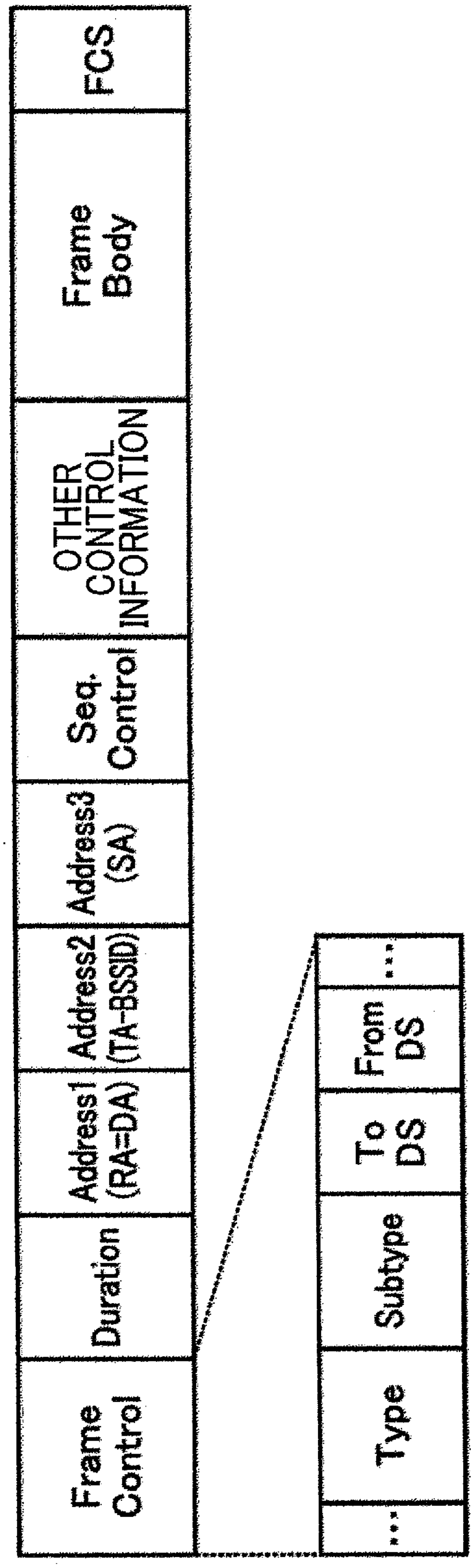
FIG. 4 is a conceptual diagram showing a specific example of a format of a wireless frame in the wireless system according to the embodiment.

FIG. 4 shows a specific example of a format of a wireless frame in the wireless system 1 according to the first embodiment. As shown in FIG. 4, the wireless frame includes, for example, a Frame Control field, a Duration field, an Address1 field, an Address2 field, an Address3 field, a Sequence Control field, other control information field, a Frame Body field, and an FCS (Frame Check Sequence) field. The Frame Control field to the other control information field correspond to, for example, a MAC header included in a MAC frame. The Frame Body field corresponds to, for example, a MAC payload contained in the MAC frame. The FCS field is information added in order to detect a frame error.

The Frame Control field indicates various types of control information and includes, for example, a Type value, a Subtype value, a To DS (To Distribution System) value, and a From DS value.

The Type value and Subtype value indicate the frame type of the wireless frame. For example, the Type value "00" indicates that the wireless frame is a management frame. The Type value "01" indicates that the wireless frame is a control frame. The Type value "10" indicates that the wireless frame is a data frame. Also, the content of the wireless frame changes depending on the combination of the Type value and the Subtype value.

The meaning of the To DS value and From DS value differs depending on the combination. For example, "00 (To DS/From DS)" indicates that the data is between terminal apparatuses in the same IBSS. "10" indicates that the data frame is directed to the DS (Distribution System) from the outside. "01" indicates that the data frame is to go out of the DS. "11" is used when forming a mesh network.

The Duration field indicates a scheduled period of using the wireless line. The Address field is used to indicate the BSSID, the transmission source address, the destination address, the sender terminal apparatus address, and the recipient terminal apparatus address.

The Sequence Control field shows the sequence number of the MAC frame and the fragment number for the fragment. The Frame Body field includes information corresponding to the type of the frame, and for example, in the case of a data frame, data is stored therein. FCS stores the error detection code of the MAC header and Frame Body, and is used to determine whether or not there is an error.

<1-2-2> Functional Configuration of Wireless System 1

In the wireless system 1 according to the first embodiment, the base station 10 establishes a multi-link with the terminal apparatus 20 based on a request from the terminal apparatus 20 for which a plurality of links have been established. Note that although the establishment of the multi-link between the base station 10 and the terminal apparatus 20 may also be triggered by the base station 10, in the present specification, a case will be described in which the multi-link is established based on a request from the terminal apparatus 20. In this specification, an operation for establishing a multi-link between the base station 10 and the terminal apparatus 20 is referred to as "multi-link processing". First, the respective functional configurations of the base station 10 and the terminal apparatus 20 related to the multi-link processing of the wireless system 1 according to the first embodiment will be described sequentially.

(Functional Configuration of Base Station 10)

Figure 5:
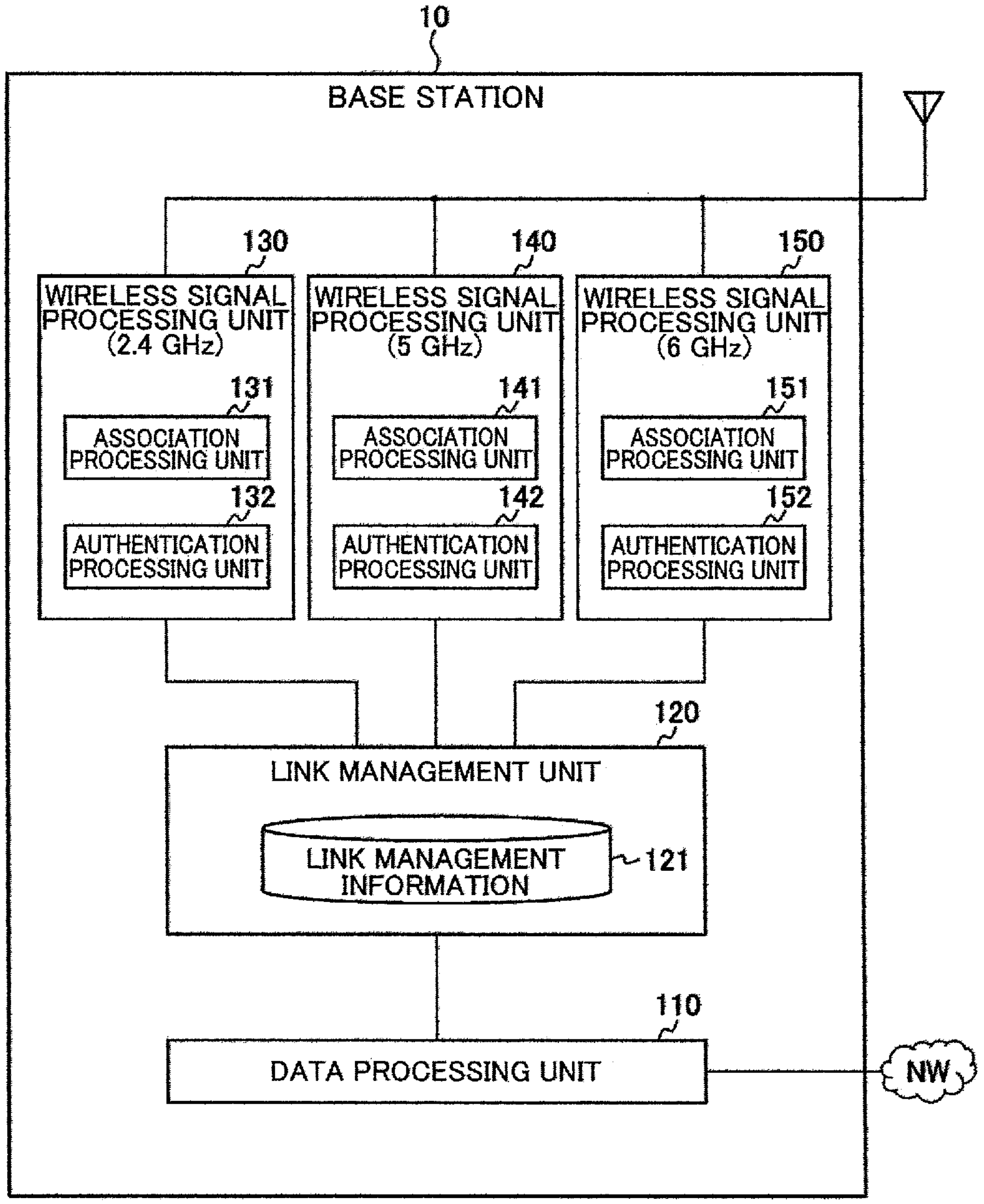
FIG. 5 is a block diagram showing an example of functions of the base station included in the wireless system according to the embodiment.

FIG. 5 shows an example of the functional configuration of the base station 10 in the wireless system 1 according to the first embodiment. As shown in FIG. 5, the base station 10 can function as, for example, a data processing unit 110, a link management unit 120, and wireless signal processing units 130, 140, and 150.

The data processing unit 110 can execute the processing of the LLC layer and the processing of the upper layer on the input data. For example, the data processing unit 110 outputs the data input from the server 30 via the network NW to the link management unit 120. Also, the data processing unit 110 transmits the data input from the link management unit 120 to the server 30 via the network NW.

The link management unit 120 can execute, for example, some of the processing of the MAC layer on the input data. Also, the link management unit 120 manages the link with the terminal apparatus 20 based on notifications from the wireless signal processing units 130, 140, and 150. The link management unit 120 includes link management information 121. The link management information 121 is stored in, for example, the RAM 13, and includes information on the terminal apparatus 20 that is wirelessly connected to the base station 10.

Also, if it is detected that a plurality of links have been established for the same terminal apparatus 20 in the link management information 121, the link management unit 120 establishes a multi-link in response to request from the link management unit 220 of the terminal apparatus 20.

Each of the wireless signal processing units 130, 140, and 150 can execute, for example, part of the processing of the MAC layer and the processing of the first layer on the input data or the wireless signal. That is, each of the wireless signal processing units 130, 140, and 150 performs transmission and reception of data between the base station 10 and the terminal apparatus 20 using wireless communication. The wireless signal processing unit 130 handles wireless signals in the 2.4 GHz band. The wireless signal processing unit 140 handles wireless signals in the 5 GHz band. The wireless signal processing unit 150 handles wireless signals in the 6 GHz band. The wireless signal processing units 130, 140, and 150 may or may not share the antenna of the base station 10.

For example, each of the wireless signal processing units 130, 140, and 150 generates a wireless frame using the data input from the link management unit 120. Then, each of the wireless signal processing units 130, 140, and 150 converts the wireless frame into a wireless signal and distributes the wireless signal via the antenna of the base station 10. Also, each of the wireless signal processing units 130, 140, and 150 converts the wireless signal received via the antenna of the base station 10 into a wireless frame and outputs the data included in the wireless frame to the link management unit 120.

Also, the wireless signal processing unit 130 includes an association processing unit 131 and an authentication processing unit 132. Also, the wireless signal processing unit 140 includes an association processing unit 141 and an authentication processing unit 142. Also, the wireless signal processing unit 150 includes an association processing unit 151 and an authentication processing unit 152. Each of the association processing units 131, 141, and 151 executes a protocol related to association if a connection request from the terminal apparatus 20 is received. Each of the authentication processing units 132, 142, and 152 executes a protocol related to authentication following the connection request.

(Functional Configuration of Terminal Apparatus 20)

Figure 6:
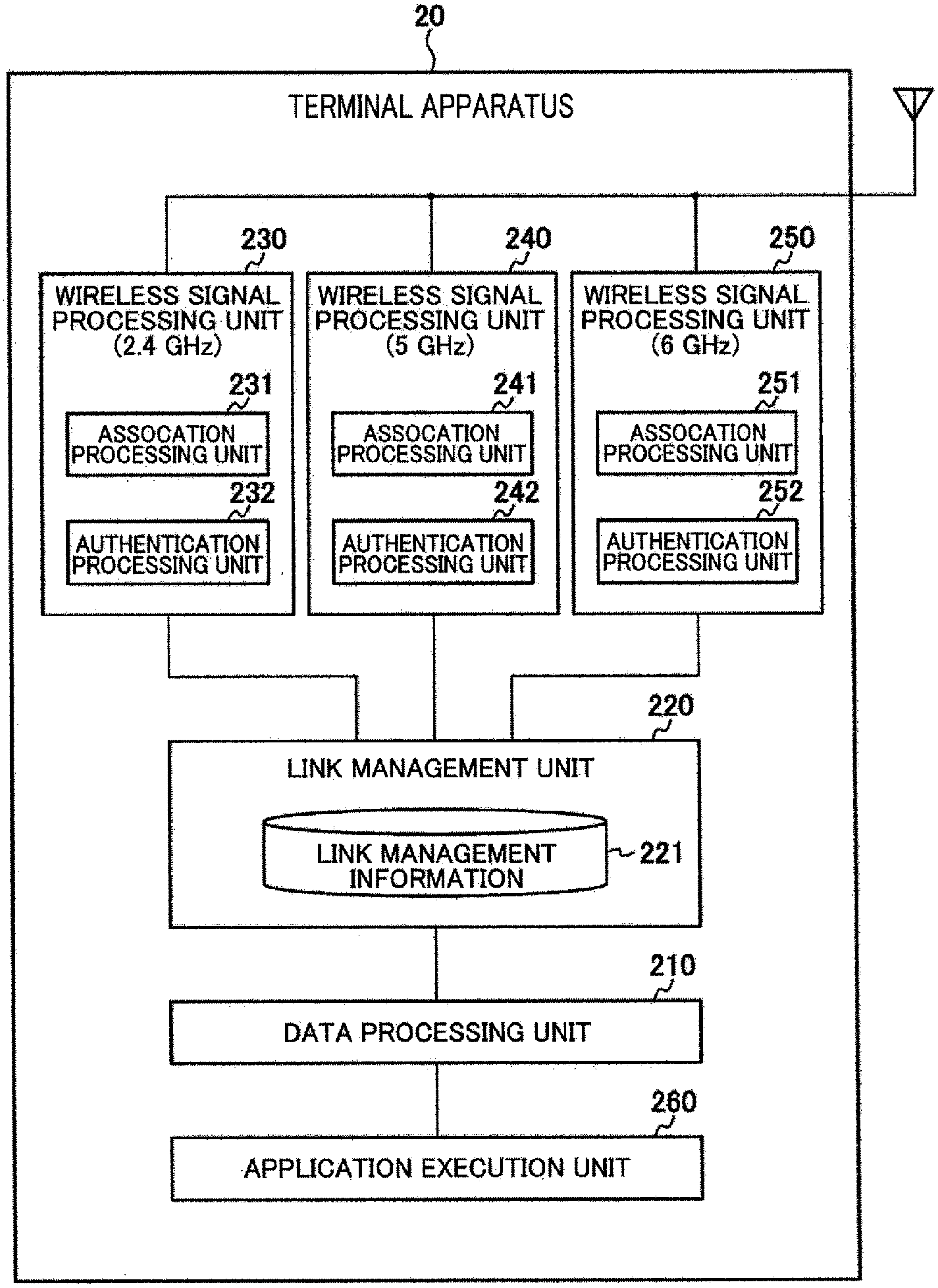
FIG. 6 is a block diagram showing an example of functions of the terminal apparatus included in the wireless system according to the embodiment.

FIG. 6 shows an example of the functional configuration of the terminal apparatus 20 in the wireless system 1 according to the first embodiment. As shown in FIG. 6, the terminal apparatus 20 can function as, for example, a data processing unit 210, a link management unit 220, wireless signal processing units 230, 240, and 250, and an application execution unit 260.

The data processing unit 210 can execute the processing of the LLC layer and the processing of the upper layer on the input data. For example, the data processing unit 210 outputs the data input from the application execution unit 260 to the link management unit 220. Also, the data processing unit 210 outputs the data input from the link management unit 220 to the application execution unit 260.

The link management unit 220 can execute, for example, some of the processing of the MAC layer on the input data. Also, the link management unit 220 manages the link with the base station 10 based on notifications from the wireless signal processing units 230, 240, and 250. The link management unit 220 includes link management information 221. The link management information 221 is stored in, for example, the RAM 23, and includes information on the base station 10 to which the terminal apparatus 20 is connected. The link management information 221 includes information similar to, for example, the link management information 121.

Also, if it is detected that a plurality of links for the same base station 10 have been established in the link management information 221, the link management unit 220 requests the base station 10 to establish a multi-link.

Each of the wireless signal processing units 230, 240, and 250 can execute, for example, some of the processing of the MAC layer and the processing of the first layer on the input data or the wireless signal. That is, each of the wireless signal processing units 230, 240, and 250 performs transmission and reception of data between the base station 10 and the terminal apparatus 20 using wireless communication. The wireless signal processing unit 230 handles wireless signals in the 2.4 GHz band. The wireless signal processing unit 240 handles wireless signals in the 5 GHz band. The wireless signal processing unit 250 handles wireless signals in the 6 GHz band. The wireless signal processing units 230, 240, and 250 may or may not share the antenna of the terminal apparatus 20.

For example, each of the wireless signal processing units 230, 240, and 250 generates a wireless frame using the data input from the link management unit 220. Then, each of the wireless signal processing units 230, 240, and 250 converts the wireless frame into a wireless signal and distributes the wireless signal via the antenna of the terminal apparatus 20.

Also, each of the wireless signal processing units 230, 240, and 250 converts the wireless signal received via the antenna of the terminal apparatus 20 into a wireless frame, and outputs the data included in the wireless frame to the link management unit 220.

Also, the wireless signal processing unit 230 includes an association processing unit 231 and an authentication processing unit 232. The wireless signal processing unit 240 includes an association processing unit 241 and an authentication processing unit 242. The wireless signal processing unit 250 includes an association processing unit 251 and an authentication processing unit 252. Each of the association processing units 231, 241, and 251 executes a protocol related to association if a connection request from the base station 10 is received. Each of the authentication processing units 232, 242, and 252 executes a protocol related to authentication following the connection request.

The application execution unit 260 executes an application that can use the data input from the data processing unit 210. For example, the application execution unit 260 can display information on the application on the display 25. Also, the application execution unit 260 can operate based on operation of the input interface.

In the functional configuration of the wireless system 1 according to the first embodiment described above, the wireless signal processing units 130, 140, and 150 of the base station 10 are configured to be able to connect to the wireless signal processing units 230, 240, and 250 of the terminal apparatus 20, respectively. Specifically, the wireless signal processing units 130 and 230 can be wirelessly connected using the 2.4 GHz band. The wireless signal processing units 140 and 240 can be wirelessly connected using the 5 GHz band. The wireless signal processing units 150 and 250 can be wirelessly connected using the 6 GHz band. Each wireless signal processing unit may be referred to as an "STA function". That is, the wireless system 1 according to the first embodiment includes a plurality of STA functions.

<1-2-3> Details of Multi-Link Processing

In the multi-link processing of the first embodiment, the terminal apparatus 20 requests the base station 10 to establish a multi-link after a connection using a plurality of STA functions is established between the base station 10 and the terminal apparatus 20. An example of a flow of multi-link processing in the wireless system 1 according to the first embodiment will be described hereinafter.

Figure 7:
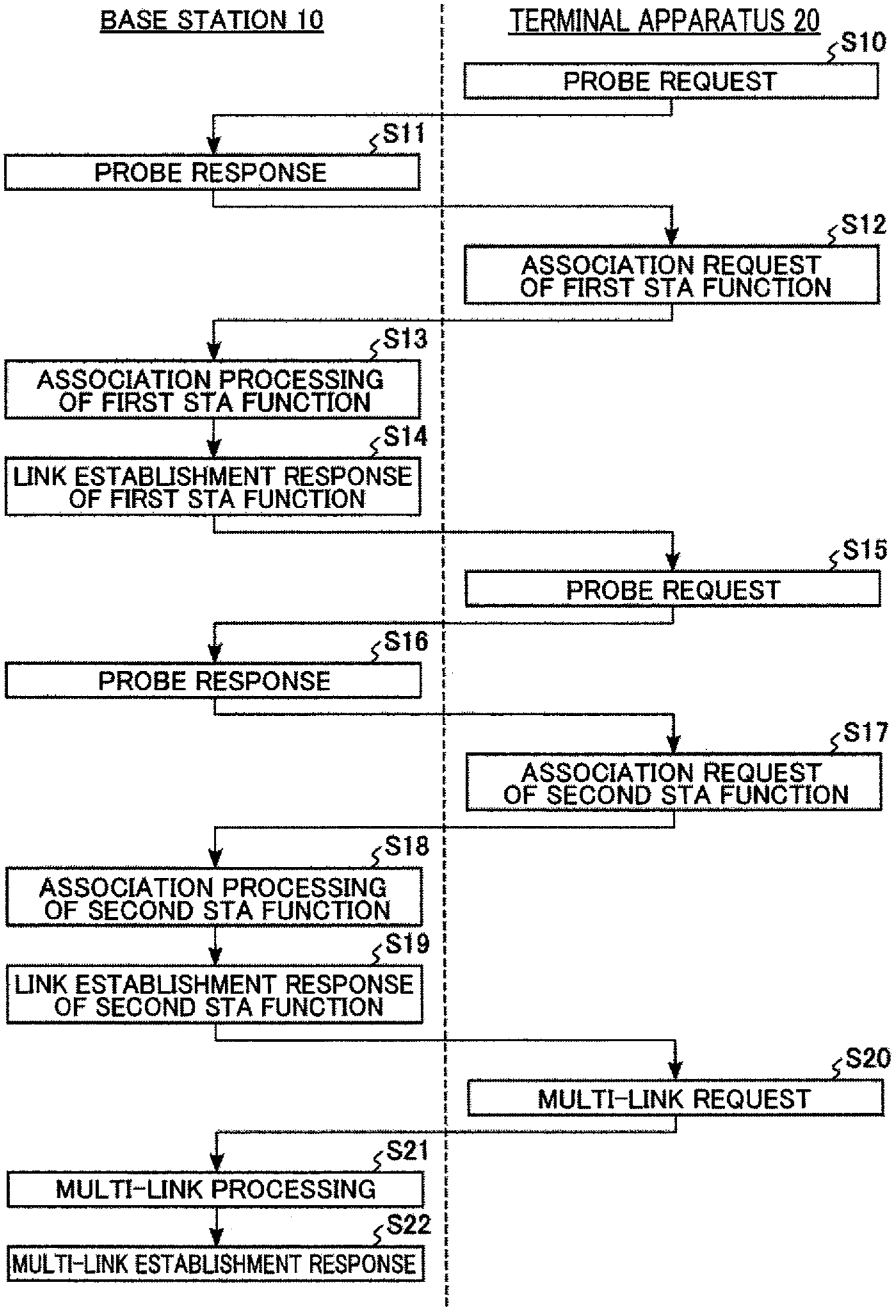
FIG. 7 is a flowchart showing an example of an operation in the wireless system according to the embodiment.

FIG. 7 is a flowchart showing an example of multi-link processing in the wireless system 1 according to the first embodiment. As shown in FIG. 7, in the multi-link processing in the first embodiment, for example, the processing of steps S10 to S22 is executed sequentially.

Specifically, first, in the processing of step S10, the terminal apparatus 20 (e.g., STA1) transmits a probe request to the base station 10. The probe request is a signal for confirming whether or not the base station 10 is present in the surrounding area of the terminal apparatus 20. The Frame Control field of the probe request includes, for example, "00/0100 (Type value/Subtype value)". Upon receiving the probe request, the base station 10 executes the processing of step S11.

In the processing of step S11, the base station 10 transmits a probe response to the terminal apparatus 20. The probe response is a signal used by the base station 10 to respond to a probe request from the terminal apparatus 20. The Frame Control field of the probe response includes, for example, "00/0101 (Type value/Subtype value)". Upon receiving the probe request, the terminal apparatus 20 executes the processing of step S12.

In the processing of step S12, the terminal apparatus 20 transmits an association request for a first STA function to the base station 10. The Frame Control field of the association request includes, for example, "00/0000 (Type value/Subtype value)". Upon receiving the association request for the first STA function, the link management unit 120 of the base station 10 executes the processing of step S13.

In the processing of step S13, the link management unit 120 of the base station 10 executes the association processing for the first STA function. Then, in the processing of step S14, the base station 10 transmits a link establishment response for the first STA function to the terminal apparatus 20. The Frame Control field of the link establishment response includes, for example, "00/0001 (Type value/Subtype value)". Accordingly, a link (wireless connection) using the first STA function is established between the base station 10 and the terminal apparatus 20.

On the other hand, in the processing of step S15, the terminal apparatus 20 (e.g., STA2) transmits a probe request to the base station 10. Upon doing so, in the processing of step S16, the base station 10 transmits a probe response to the terminal apparatus 20. Upon receiving the probe request, the terminal apparatus 20 executes the processing of step S17.

In the processing of step S17, the terminal apparatus 20 transmits an association request for a second STA function to the base station 10. Upon receiving the association request, the link management unit 120 of the base station 10 executes the processing of step S18.

In the processing of step S18, the link management unit 120 of the base station 10 executes the association processing for the second STA function. Then, in the processing of step S19, the base station 10 transmits a link establishment response for the second STA function to the terminal apparatus 20. Accordingly, a link using the second STA function is established between the base station 10 and the terminal apparatus 20.

At this time, a link using the first STA function and a link using the second STA function are established between the base station 10 and the terminal apparatus 20. If the link management unit 220 of the terminal apparatus 20 recognizes that a plurality of links for the same base station 10 have been established using a plurality of STA functions, the link management unit 220 executes the processing of step S20.

In the processing of step S20, the terminal apparatus 20 transmits a multi-link request to the base station 10. The multi-link request is a signal for requesting the base station 10 to establish a multi-link using a plurality of links if a plurality of links using a plurality of STA functions have been established between the base station 10 and the terminal apparatus 20. The Frame Control field of the multi-link request includes, for example, "00/xxxx (Type value/Subtype value (xxxx is a predetermined numeric value))". Upon receiving the multi-link request, the link management unit 120 of the base station 10 executes the processing of step S21.

In the processing of step S20, the link management unit 120 of the base station 10 executes the multi-link processing. A multi-link using a plurality of links established between the base station 10 and the terminal apparatus 20 is established through this multi-link processing. When the multi-link is established, in the processing of step S21, the base station 10 transmits a multi-link establishment response to the terminal apparatus 20. As a result, the terminal apparatus

20 recognizes that a multi-link has been established with the base station 10. As a result, the multi-link processing of the wireless system 1 according to the first embodiment is complete, and data communication using the multi-link is possible between the base station 10 and the terminal apparatus 20.

Note that in the above-described processing, the link management unit 120 of the base station 10 updates the link management information 121 as appropriate. Similarly, the link management unit 220 of the terminal apparatus 20 updates the link management information 221 as appropriate. For example, the link management units 120 and 220 sequentially update the link management information when a link or a multi-link is established.

FIG. 8 shows an example of the link management information 121 in the wireless system 1 according to the first embodiment. As shown in FIG. 8, the link management information 121 includes, for example, information on the STA function, frequency, link destination ID, presence/absence of a multi-link, and traffic ID (TID). The link destination ID in the link management information 121 corresponds to, for example, the identifier of the terminal apparatus 20. On the other hand, the link destination ID in the link management information 221 corresponds to, for example, the identifier of the base station 10. In this example, "STA1" corresponds to the STA function that uses the 6 GHz frequency band. "STA2" corresponds to the STA function that uses the 5 GHz frequency band. "STA3" corresponds to the STA function that uses the 2.4 GHz frequency band.

Also, in this example, a multi-link using "STA1" and "STA2" has been established. When the multi-link is established, each of the link management units 120 and 220 transmits the data input from the upper layer using the link of at least one STA function associated with the multi-link. The link management units 120 and 220 may associate the traffic and the STA function with each other based on the type of traffic.

For example, the link management unit 220 of the terminal apparatus 20 determines the association between the traffic and the STA function, and sends a request to the link management unit 120 of the base station 10. Then, the base station 10 confirms the association between the traffic and the STA function by responding to the request. Also, one STA function may be associated with one type of traffic, or a plurality of STA functions may be associated with one type of traffic. In this example, "STA1" is associated with "TID #1" and "TID #2". "STA2" is associated with "TID #1" and "TID #3".

In this manner, when a plurality of STA functions are associated with one type of traffic, data is transmitted in parallel by the plurality of STA functions. When one type of traffic is transmitted in parallel, it is necessary to distribute and sort the data between the link management unit 120 of the base station 10 and the link management unit 220 of the terminal apparatus 20. The distribution of the data is executed by the link management unit on the transmitting side, and the link management unit on the transmitting side adds a flag indicating the multi-link and an identification number to the wireless frame. The sorting of the data is executed by the link management unit on the receiving side.

<1-3> Effect of Embodiment

With the wireless system 1 according to the first embodiment described above, a method for using content distributed wirelessly can be made easier. Detailed effects of the wireless system 1 according to the first embodiment will be described hereinafter.

Base stations and terminal apparatuses that use a wireless LAN include a plurality of STA functions provided for each band used, for example, 2.4 GHz, 5 GHz, and 6 GHz, in some cases. In such a wireless system, for example, by selecting one STA function among a plurality of STA functions, a wireless connection is established and data communication between the base station and the terminal apparatus is performed. At this time, in the wireless system, the unselected STA function is not used even if there is a base station corresponding to the band of the STA function.

In contrast to this, the wireless system 1 according to the first embodiment utilizes a plurality of STA functions provided in each of the base station 10 and the terminal apparatus 20 to establish a multi-link between the base station 10 and the terminal apparatus 20. Stated briefly, the base station 10 includes a link management unit 120, and the terminal apparatus 20 has a link management unit 220.

Then, when the link management unit 220 of the terminal apparatus 20 recognizes that a plurality of links have been established with the same base station 10, the link management unit 220 transmits a multi-link request to the base station 10. Upon doing so, the link management unit 120 of the base station 10 establishes a multi-link based on the received multi-link request. In this manner, the multi-link of the wireless system 1 according to the embodiment is established due to the terminal apparatus 20 requesting a multi-link to the base station 10 based on a plurality of links that have already been established.

As described above, the multi-link in the wireless system 1 according to the first embodiment is established due to the terminal apparatus 20 requesting the multi-link to the base station 10. In data communication through a multi-link, a plurality of bands can be used together, and the functions of the wireless LAN device can be fully utilized. As a result, the wireless system 1 according to the first embodiment can realize efficient communication and can improve the communication speed.

Also, the wireless system 1 according to the first embodiment can continue communication using another STA function even if the connection through one STA function is canceled in the multi-link state. Furthermore, the wireless system 1 according to the first embodiment can also use a multi-link to communicate between the link management unit 120 of the base station 10 and the link management unit 220 of the terminal apparatus 20 while performing link aggregation processing and switching. As a result, the wireless system 1 according to the first embodiment can also improve the communication stability.

<2> Second Embodiment

The wireless system 1 according to a second embodiment has, for example, the same configuration as that of the first embodiment. Also, the wireless system 1 according to the second embodiment establishes the same multi-link as the first embodiment using a plurality of channels included in the same frequency band. Points in which the wireless system 1 according to the second embodiment differs from the first embodiment will be described hereinafter.

<2-1> Band Used for Wireless Communication

Figure 9:
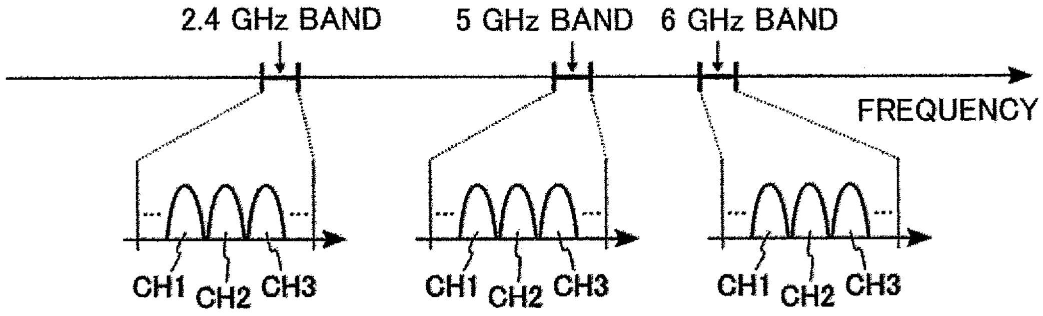
FIG. 9 is a conceptual diagram showing an example of a band to be used for wireless communication in a wireless system according to a modified example of the embodiment.

FIG. 9 shows an example of a frequency band used for wireless communication in the wireless system 1 according to the second embodiment. As shown in FIG. 9, in wireless communication, for example, the 2.4 GHz band, the 5 GHz band, and the 6 GHz band are used. Each frequency band includes a plurality of channels. In this example, it is assumed that each of the 2.4 GHz band, 5 GHz band, and 6 GHz band includes at least three channels CH1, CH2, and CH3. Communication using each channel CH is realized by the associated STA function.

<2-2> Multi-Link Processing

The wireless system 1 according to the second embodiment establishes the same multi-link as in the first embodiment using a plurality of channels CH included in the same frequency band. The multi-link processing in the second embodiment is the same as the multi-link processing described in the first embodiment in which the band used for the multi-link is changed to a plurality of channels CH included in the same frequency band.

FIG. 10 shows an example of the link management information 121 in the wireless system 1 according to the second embodiment. As shown in FIG. 10, the link management information 121 in the second embodiment has a configuration in which information related to the channel ID for each frequency band is added to the link management information 121 in the first embodiment. Also, in this example, the same multi-link as in the first embodiment is established using the channel CH2 of "STA1" corresponding to the 6 GHz frequency band and the channel CH3 of "STA2" corresponding to the 6 GHz frequency band.

<2-3> Effect of Second Embodiment

As described above, the same frequency band may be used for each STA function of the base station 10 and the terminal apparatus 20. Also, the multi-link between the base station 10 and the terminal apparatus 20 may be established by a plurality of STA functions using the same frequency band. Specifically, a plurality of STA functions may form a multi-link using, for example, different channels CH in the 5 GHz band. Even in such a case, the wireless system 1 according to the second embodiment can realize efficient communication and improve communication stability, similarly to the first embodiment.

<3> Other Modified Examples, etc.

In the above-described embodiment, a case was illustrated in which only the association processing was executed in the establishment of the link of each STA function, but there is no limitation to this. The wireless system 1 may also apply various options to the multi-link processing. For example, authentication processing, notification of a candidate link, or the like may be executed during the establishment of the link. In this manner, the option to be used in the establishment of the link can be selected as appropriate.

In the above-described embodiment, a case was illustrated in which the association processing unit and the authentication processing unit are provided in each wireless signal processing unit, but there is no limitation to this. For example, the link management unit 120 of the base station 10 may include the association processing unit and the authentication processing unit and the link management unit 220 of the terminal apparatus 20 may include the association processing unit and the authentication processing unit. In this case, each of the link management units 120 and 220 executes the association and authentication of each wireless signal processing unit.

In the above-described embodiment, each STA function may notify the corresponding link management unit when the link cannot be maintained due to movement of the terminal apparatus 20 or the like. Also, the link management unit 220 of the terminal apparatus 20 may change the multi-link state with the link management unit 120 of the base station 10 based on a notification from an STA function. Specifically, for example, the link management unit 220 of the terminal apparatus 20 and the link management unit 120 of the base station 10 may change the STA function used in the multi-link as appropriate. If the multi-link status is changed, the link management units 120 and 220 update the link management information 121 and 221 respectively. Also, the link management units 120 and 220 may update the association between the traffic and the STA function according to an increase or decrease in the number of links.

The configuration of the wireless system 1 according to the first embodiment is merely an example, and other configurations may be used. For example, although a case was illustrated in which each of the base station 10 and the terminal apparatus 20 has three STA functions (wireless signal processing units), the present invention is not limited to this. The base station 10 may include at least two wireless signal processing units. Similarly, the terminal apparatus 20 may include at least two wireless signal processing units. Also, the number of channels that can be processed by each STA function can be set as appropriate according to the frequency band used. Each of the wireless communication modules 14 and 24 may support wireless communication in a plurality of frequency bands using a plurality of communication modules, or may support wireless communication in a plurality of frequency bands using a single communication module. If the operation described in the above-described embodiment can be executed, the arrangement of the association processing unit and the authentication processing unit can be changed as appropriate.

Also, the functional configurations of the base station 10 and the terminal apparatus 20 in the wireless system 1 according to the first embodiment are merely examples. The functional configuration of the base station 10 and the terminal apparatus 20 may have other names and groupings as long as the operations described in each embodiment can be executed. For example, in the base station 10, the data processing unit 110 and the link management unit 120 may be collectively referred to as a data processing unit. Similarly, in the terminal apparatus 20, the data processing unit 210 and the link management unit 220 may be collectively referred to as a data processing unit.

Also, in the wireless system 1 according to the first embodiment, the CPU included in each of the base station 10 and the terminal apparatus 20 may be another circuit. For example, an MPU (Micro Processing Unit) or the like may be used instead of the CPU. Also, each of the processes described in each embodiment may be realized using dedicated hardware. The wireless system 1 according to each embodiment may include both processes executed by software and processes executed by hardware, or may include only one of them.

In each embodiment, the flowchart used to describe the operations is merely an example. The multi-link processing is an operation of establishing a multi-link based on at least the request of the terminal apparatus 20, and the order of the processing may be changed within a possible range, or other processing may be added. Also, the format of the wireless frame described in the above embodiment is merely an example. The wireless system 1 may use another wireless frame format as long as it is possible to execute the multi-link processing described in each embodiment.

In the present specification, "connection" corresponds to a state in which communication of data is possible. The "connection request" corresponds to the terminal apparatus 20 requesting connection with the base station 10 in order to communicate with the network NW. Each of the "association processing" and the "authentication processing" corresponds to processing for assigning the terminal apparatus 20 to the base station 10.

Although several embodiments of the present invention have been described, these embodiments are presented as examples and are not intended to limit the scope of the invention. These novel embodiments can be implemented in various other embodiments, and various omissions, replacements, and changes can be made thereto without departing from the gist of the invention. These embodiments and modifications thereof are included in the scope and gist of the invention, as well as in the scope of the invention described in the claims and the range of equivalency thereof.

REFERENCE SIGNS LIST

1 Wireless system
10 Base station
20 Terminal apparatus
30 Server
11, 21 CPU
12, 22 ROM
13, 23 RAM
14, 24 Wireless communication module
15 Wired communication module
25 Display
26 Storage
110, 210 Data processing unit
120, 220 Link management unit
121, 221 Link management information
122, 131, 141, 151, 222, 231, 241, 251 Association processing unit
123, 132, 142, 152, 223, 232, 242, 252 Authentication processing unit
130, 140, 150, 230, 240, 250 Wireless signal processing unit

The invention claimed is:

1. A base station comprising:
a first wireless signal processing circuit configured to transmit and receive a wireless signal using a first channel;
a second wireless signal processing circuit configured to transmit and receive a wireless signal using a second channel different from the first channel; and
processing circuitry configured to:
establish a first link with a terminal apparatus using the first wireless signal processing circuit;
establish a second link with the terminal apparatus using the second wireless signal processing circuit;
establish a multi-link with the terminal apparatus using the first link and the second link upon receiving a multi-link request from the terminal apparatus while the first link and the second link are established;
update link management information including a link destination ID, a frequency band, presence or absence of a multi-link, and a Traffic ID (TID), wherein the processing circuit associates the TID with at least one of the first wireless signal processing circuit and the second wireless signal processing circuit based on the link management information; and
if the processing circuitry detects that the first link and the second link have been established for the same terminal apparatus, receive the multi-link request.

2. The base station according to claim 1, wherein the first channel and the second channel are included in mutually different frequency bands.

3. The base station according to claim 1, wherein the first channel and the second channel are included in a frequency band.

4. A terminal apparatus comprising:
a first wireless signal processing circuit configured to transmit and receive a wireless signal using a first channel;
a second wireless signal processing circuit configured to transmit and receive a wireless signal using a second channel different from the first channel; and
processing circuitry configured to:
establish a first link with a base station using the first wireless signal processing circuit;
establish a second link with the base station using the second wireless signal processing circuit;
establish a multi-link with the base station using the first link and the second link upon transmitting a multi-link request to the base station while the first link and the second link are established;
update link management information including a link destination ID, a frequency band, presence or absence of a multi-link, and a Traffic ID (TID), wherein the processing circuitry associates the TID with at least one of the first wireless signal processing circuit and the second wireless signal processing circuit based on the link management information; and
if the processing circuitry detects that the first link and the second link have been established for the same base station, transmit the multi-link request.

5. The terminal apparatus according to claim 4, wherein the first channel and the second channel are included in mutually different frequency bands.

6. The terminal apparatus according to claim 4, wherein the first channel and the second channel are included in a frequency band.

* * * * *